Patented Feb. 9, 1943

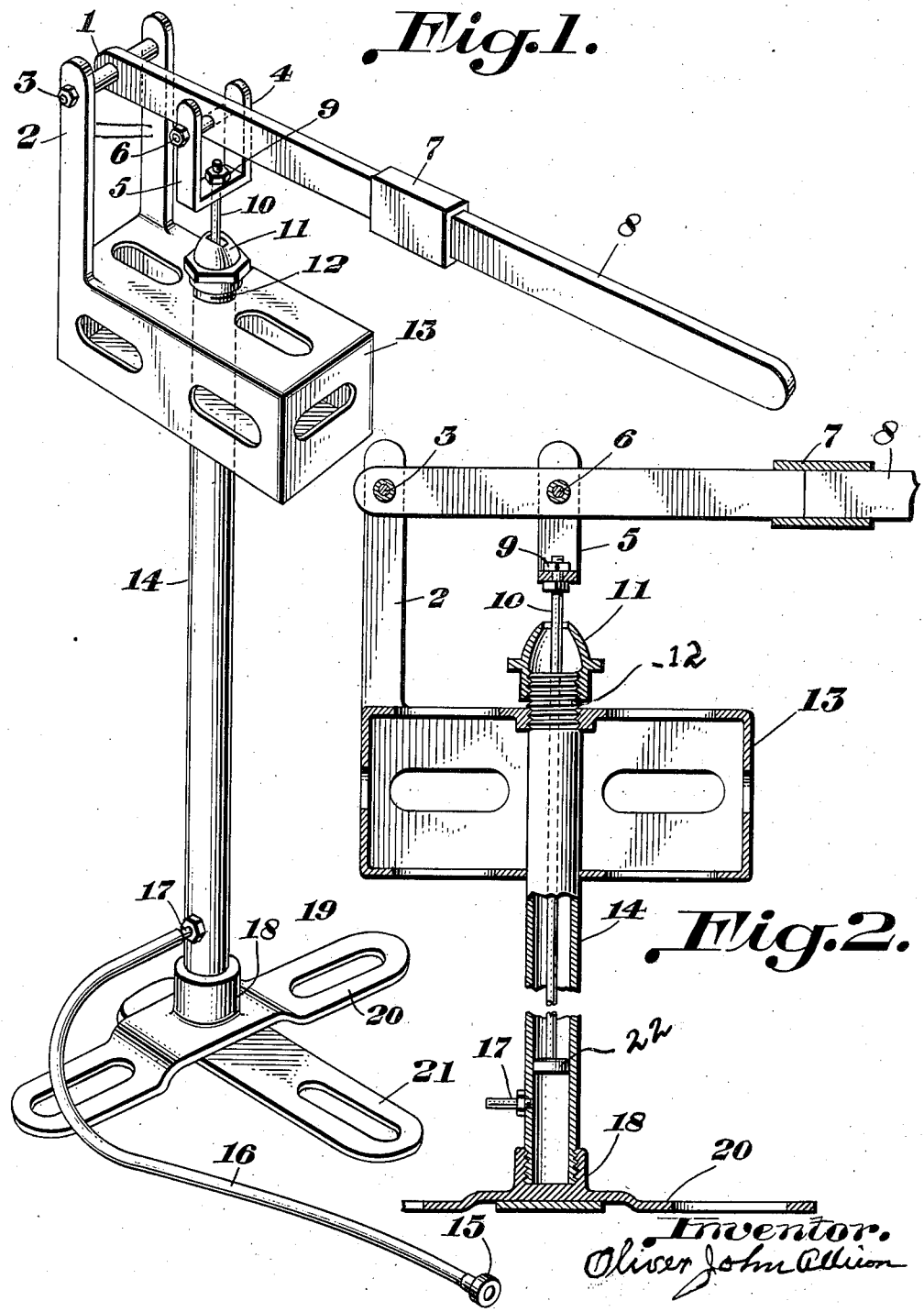

2,310,565

UNITED STATES PATENT OFFICE 2,310,565

AUTOMOBILE TIRE FORCE PUMP

Oliver John Allison, New Orleans, La., assignor of one-half to O'Neal August Diaz, New Orleans, La.

Application November 3, 1941, Serial No. 417,717

2 Claims. (Cl. 230—220)

This invention has for an object to provide an automobile tire force pump which is simple in construction and efficient in operation particularly for use in inflating automobile tires when the air pressure therein is too low.

The novel features which are believed to be characteristic of the invention are set forth with particularity in the appended claims. The invention itself, however, both as to its organization and method of use, together with additional objects and advantages thereof, will be best understood from the following description of a specific embodiment when read in connection with the accompanying drawing in which, Fig. 1 is a perspective view of the device.

Fig. 2 is a view mostly in vertical section.

Referring to the drawing which shows a specific embodiment of the invention, a lever 1 is pivoted at one end upon a detachable rod 3 mounted upon the upper ends of two standards 2 extending up from a supporting member 13 screw threaded upon the upper portion of a pump barrel 14. A plunger rod 10 having a plunger at its lower end extends loosely through a cap 11 screw threaded on the upper end of the barrel 14. The rod 10 is secured by a nut 9 to the middle portion of a U-shaped member having upstanding arms 4 and 5. A detachable rod 6 extends through these arms and through an intermediate portion of the lever 1. A sleeve 7 serves to connect a lever extension member 8 to the lever 1 whereby greater leverage is obtained.

A flexible tube 16 is connected at one end to a nipple 17 with which the lower end of the barrel 14 is provided. The other end of the tube 16 is provided with a connector 15 for attachment to the valve stem of a tire. A cup-like member 18 is screw threaded on the lower end of the barrel 14. Two arms 20 and 21 are secured at right angles to the member 18, these arms being adapted to rest upon the ground for supporting the pump for the pumping operation.

The operation and advantages of this invention will be apparent from the foregoing description and the accompanying drawing. The member 13 attached to the upper portion of the pump barrel provides a support for attachment of the lever member 8 may all be detached so that the The screw threaded members 11, 13 and 18, the rods 3 and 6, the U-shaped member, and the lower member 8 may all be detached so that the device may be packed and carried in a comparatively small space.

The following is what is claimed:

1. An air pump comprising a base, a pump cylinder supported on said base, an inlet and an outlet valve for said cylinder, a piston in said cylinder, a piston rod attached to said piston, a support having a box like shape having openings in its bottom and top portions, said cylinder passing freely through the opening in the bottom portion and screw-threaded through the opening in the top portion, said support having a pair of upstanding lugs secured thereto, an operating lever pivotally attached to said lugs, and a pivotal connection between said lever and said piston rod.

2. An air pump comprising a base, a pump cylinder supported on said base, an inlet and an outlet valve for said cylinder, a piston in said cylinder, a piston rod attached to said piston, a support having a box like shape having openings in its bottom and top portions, said cylinder passing freely through the opening in the bottom portion and screw-threaded through the opening in the top portion and extending a slight distance above the top portion, a slotted cap, secured to the extending screw-threaded portion, said support having a pair of upstanding lugs secured thereto, an operating lever pivotally attached to said lugs and a pivotal connection between said lever and said piston rod.

OLIVER JOHN ALLISON.